(12) United States Patent
Kennison et al.

(10) Patent No.: US 8,331,675 B2
(45) Date of Patent: Dec. 11, 2012

(54) REDUCING LATENCY IN A DETECTION SYSTEM

(75) Inventors: Justin Kennison, St. Petersburg, FL (US); Ingo Donasch, Sarasota, FL (US); James Connelly, St. Petersburg, FL (US)

(73) Assignee: L-3 Communications Security and Detection Systems, Inc., Woburn, MA (US)

( * ) Notice: Subject to any disclaimer, the term of this patent is extended or adjusted under 35 U.S.C. 154(b) by 1152 days.

(21) Appl. No.: 12/184,520

(22) Filed: Aug. 1, 2008

(65) Prior Publication Data

US 2009/0034792 A1    Feb. 5, 2009

Related U.S. Application Data

(60) Provisional application No. 60/953,587, filed on Aug. 2, 2007.

(51) Int. Cl.
*G06K 9/00* (2006.01)
(52) U.S. Cl. ........................................................ 382/181
(58) Field of Classification Search .................. 382/181, 382/132, 131, 103; 378/57
See application file for complete search history.

(56) References Cited

U.S. PATENT DOCUMENTS 5,600,303 A    2/1997  Husseiny et al.
6,317,509 B1 *  11/2001  Simanovsky et al. ......... 382/131
2004/0101097 A1  5/2004  Wakayama et al.
2005/0163345 A1  7/2005  van den Bergen et al.
2007/0297560 A1  12/2007  Song et al.

FOREIGN PATENT DOCUMENTS

WO    WO2007103216 A3    9/2007

OTHER PUBLICATIONS

Supplementary European Search Report issued in Application No. EP 08 826777.8, dated Nov. 2, 2010, 4 pages.
European Patent Office Communication Pursuant to Article 94(3) EPC, issued in Application No. EP 08 826777.8, dated Nov. 15, 2010, 5 pages.
Qi et al., "A progressive transmission capable diagnostically lossless compression scheme for 3D medical image sets," Information Sciences, Amsterdam, NL, vol. 175, No. 3, Oct. 14, 2005, pp. 217-243.

(Continued)

*Primary Examiner* — Claire X Wang
(74) *Attorney, Agent, or Firm* — Fish & Richardson P.C.

(57) ABSTRACT

A first multi-dimensional digital image of a scan region is generated. The scan region is included in a materials-detection apparatus and is configured to receive and move containers through the materials-detection apparatus. A pre-defined background range of values is accessed, the background range of values representing a range of values associated with non-target materials and the background range of values being distinct from values associated with the target materials. A value of a voxel included in the multi-dimensional digital image is compared to the background range of values to determine whether the value of the voxel is within the background range of values. If the value of the voxel is within the background range of values, the voxel is identified as a voxel representing a low-density material. A second multi-dimensional digital image that disregards the identified voxel is generated to compress the first multi-dimensional digital image.

23 Claims, 7 Drawing Sheets

OTHER PUBLICATIONS

International Search Report and Written Opinion for corresponding International Application No. PCT/US08/71952, mailed Nov. 3, 2008, 11 pages.

Product Brochure for "CTX 9000 DSi™: Designed for Integration," GE InVision, Inc., 2006, 4 pages.

Communication pursuant to Article 94(3) EPC for European Application No. 08826777.8, mailed May 31, 2011, 5 pages.

Examiner's First Report on Australian Application No. 2008283828, mailed Jun. 12, 2012.

* cited by examiner

REDUCING LATENCY IN A DETECTION SYSTEM

CROSS-REFERENCE TO RELATED APPLICATION

This application claims priority to U.S. Provisional Application Ser. No. 60/953,587, titled LATENCY REDUCTION IN EXPLOSIVE DETECTION SYSTEMS, and filed on Aug. 2, 2007, which is incorporated by reference in its entirety.

TECHNICAL FIELD

This disclosure relates to techniques for reducing latency in a detection system.

BACKGROUND

A detection system designed to detect explosives, hazardous materials, contraband, or other types of items of interest may produce large, uncompressed multi-dimensional digital images of items passing through the detection system. Such images may cause latency in the explosive detection system due to time delays caused by transferring the multi-dimensional images to other components within the detection system for analysis.

SUMMARY

In one general aspect, a first multi-dimensional digital image of a scan region is generated. The scan region is included in a materials-detection apparatus and is configured to receive and move containers through the materials-detection apparatus. A pre-defined background range of values is accessed, the background range of values representing a range of values associated with non-target materials and the background range of values being distinct from values associated with the target materials. A value of a voxel included in the multi-dimensional digital image is compared to the background range of values to determine whether the value of the voxel is within the background range of values. If the value of the voxel is within the background range of values, the voxel is identified as a voxel representing a low-density material. A second multi-dimensional digital image that disregards the identified voxel is generated to compress the first multi-dimensional digital image.

Implementations may include one or more of the following features. Generating a second multi-dimensional digital image may include generating a second multi-dimensional digital image that excludes the identified voxel. A mapping that represents the location of the identified voxel relative to other voxels included in the first multi-dimensional digital image may be generated. Generating a second multi-dimensional digital image may include generating a second multi-dimensional digital image that replaces the value of the identified voxel with a pre-defined value. The second multi-dimensional digital image may be analyzed for target materials without analyzing the disregarded voxel. The background range may include a subset of the ranges for non-target materials. The non-target material may include air and air-like materials.

The scan region may include a container that includes non-target materials and target materials, and the image of the scan region may include voxels representing the entire container, voxels representing the non-target items, and voxels representing the target materials. The target materials may include one or more of explosives and controlled substances. The scan region may include a tunnel sized to accommodate luggage and hand-carried packages. The scan region may include a region configured to receive cargo. The scan region may include a container and air surrounding the container. Whether the scan region includes a container may be determined before generating the first multi-dimensional image.

The second multi-dimensional digital image may be transferred across a network to a processor remote from the explosives-detection apparatus, and the second multi-dimensional digital image may be analyzed for the presence of target materials. Analyzing the second multi-dimensional digital image for the presence of target materials may include analyzing a visual presentation of the second multi-dimensional digital image for the presence of target materials. The second multi-dimensional image may be compressed with a non-lossy compression technique, and a third multi-dimensional image may be generated from the compressed second multi-dimensional image.

The first multi-dimensional digital image may include a representation of a container, and a contiguous segment may be identified in the first multi-dimensional digital image as a segment that includes voxels representing a non-target material outside of the container. The segment may be bound by a boundary representing an interface between the non-target material outside of the container and an edge of the container. A pointer referring to the boundary may be generated in the first multi-dimensional digital image, and the pointer may be transferred over a network to a processor remote from the explosives-detection apparatus. A request may be received from the remote processor for a portion of the first multi-dimensional digital image referred to by the pointer, the portion including the representation of the container, and the portion of the first multi-dimensional digital image may be transferred over the network to the remote processor.

In another general aspect, a materials-detection system includes a screening apparatus that includes a scan region configured to receive and move containers through the screening apparatus, and an imaging system configured to produce a first multi-dimensional digital image of the scan region, the first multi-dimensional digital image including voxels. The system also includes a latency reduction module configured to compress the first multi-dimensional digital image of the receiving region. The latency reduction module is also configured to receive the first multi-dimensional digital image of an air-filled region, access a pre-defined background range of values. The background range of values representing a range of values associated with non-target materials and the background range of values being distinct from values associated with target materials. A value of a voxel included in the multi-dimensional digital image is compared to the background range of values to determine whether the value of the voxel is within the background range of values. If the value of the voxel is within the background range of values, the voxel is identified as a voxel representing a non-target material. A second multi-dimensional digital image that disregards the identified voxel is generated to compress the first multi-dimensional digital image. The system also includes an analysis station configured to receive the second multi-dimensional digital image, and present the second multi-dimensional digital image.

In another general aspect, a multi-dimensional digital image of a scan region that includes an item of interest and a second item is generated, the multi-dimensional digital image including voxels. The scan region is included in a materials-detection apparatus and is configured to receive and move containers through the materials-detection apparatus. The voxels included in the multi-dimensional digital image are analyzed to identify portions of the multi-dimensional digital image that have characteristics of items of interest, and the identified portions of the multi-dimensional digital image that have characteristics of the items of interest are selected. The selected portions are transferred over a network before transferring unselected portions, and the selected portions are presented before enabling presentation of the unselected portions.

Implementations may include one or more of the following features. The second item may be an item not of interest. The items of interest may include a contraband item, and analyzing the voxels included in multi-dimensional digital image to identify portions of the multi-dimensional digital image that have characteristics of items of interest may include analyzing the voxels to identify a portion of the multi-dimensional digital image having characteristics associated with the contraband item. The identified portions of the multi-dimensional digital image may be analyzed, and a measure of confidence that a particular identified portion includes a representation of a contraband item may be determined. The identified portion may be prioritized relative to other identified portions based on the measure of confidence. A contraband item may include an explosive material. Selecting the identified portions may include prioritizing the identified portions relative to portions of the multi-dimensional digital image that include representations of innocuous items and portions of the multi-dimensional digital image that include representations of air. A region surrounding an item of interest may be identified, and the region surrounding the item of interest may be transferred over the network with a portion of the multi-dimensional digital image that includes the item of interest.

Identifying portions of the multi-dimensional digital image that have characteristics of items of interest may include identifying a first portion of the multi-dimensional digital image that includes a representation of an item of interest before identifying a second portion of the multi-dimensional digital image that includes a representation of a second item of interest, and transferring the identified portions based on the prioritization may include transferring the first portion of the multi-dimensional digital image before identifying the second portion of the multi-dimensional digital image. The multi-dimensional digital image of the region may be transferred over the network after transferring the identified portions. The identified portions may be displayed, and transferring the multi-dimensional digital image of the region and the identified portions may include transferring the multi-dimensional digital image of the region and the identified portions to a remote processor. Transferring the multi-dimensional digital image of the region after transferring the identified portions may include transferring the multi-dimensional digital image of the region in the background while displaying the identified portions.

In another general aspect, a materials-detection system includes a screening apparatus that includes a scan region configured to receive and move containers through the screening apparatus, and an imaging system configured to produce a multi-dimensional digital image of the scan region, the multi-dimensional digital image including voxels. The system also includes a detection module configured to analyze the multi-dimensional image to identify portions of the multi-dimensional image that have characteristics of items of interest, and a latency reduction module. The latency reduction module is configured to select the identified portions of the multi-dimensional digital image that have characteristics of the items of interest, and to transfer the selected portions over a network before transferring unselected portions. The system also includes an analysis station configured to receive the selected portions, and present the selected portions before enabling presentation of the unselected portions.

Implementations of any of the techniques described above may include a method, a process, a system, a device, an apparatus, or instructions stored on a computer-readable medium. The details of one or more implementations are set forth in the accompanying drawings and the description below. Other features will be apparent from the description and drawings, and from the claims.

DETAILED DESCRIPTION

Figure 1A:
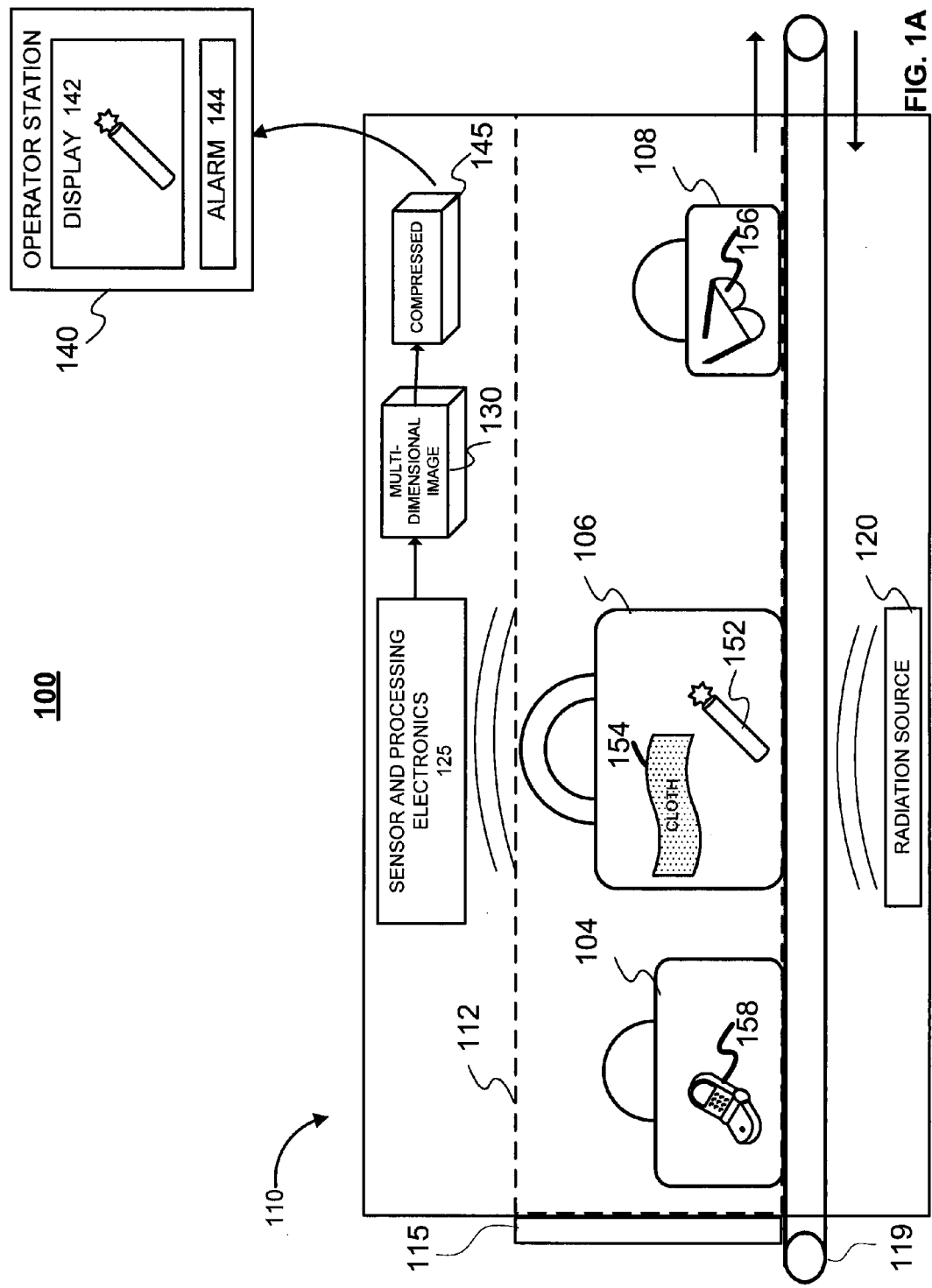
FIG. 1A illustrates an example of a materials analysis system.

Referring to FIG. 1A, an example system 100 for detecting the presence of items of interest such as explosives, hazardous materials, controlled substances (e.g., illegal drugs and narcotics), or contraband in containers 104, 106, and 108 is illustrated. The system 100 may be a materials detection system. The system 100 may be used to process, image, and analyze a large volume of containers at, for example, a civilian, military, or commercial airport, a rail station, a bus terminal, a seaport, a public gathering place, or a boarder checkpoint. For example, the system 100 compresses images, or portions of images, representing the containers 104, 106, and 108 determined to represent air, materials similar to air (such as items having a relatively low density), or other materials known to not be items of interest to reduce the latency of the system 100. The latency of the system 100 may be a delay time from when a container, such as the container 104, 106, or 108, enters the system 100 to when a decision is made as to whether the container includes items of interest, does not include items of interest, or should be flagged for further processing.

As discussed in more detail below, disregarding the portions of the multi-dimensional digital images representing air, or other materials with properties similar to air, may result in a compressed multi-dimensional digital image that may be transferred over a network to an operator or automated process more quickly than an uncompressed image, thus reducing the latency of the system 100. The compressed multi-dimensional digital image also may be analyzed more quickly than the original multi-dimensional digital image, which may further reduce the latency of the system 100. Additionally or alternatively, portions of the multi-dimensional digital image that include voxels having characteristics associated with items of interest may be identified and transferred over the network before the remaining portions of the multi-dimensional digital image to reduce the latency of the system 100.

The multi-dimensional images may be computed tomography (CT) images that include voxels that represent an imaged object (such as the containers 104, 106, and 108). The voxels are each associated with a value that approximately corresponds to the average atomic weight of the imaged object. The voxel values may be represented as CT values. The CT values may be expressed in Hounsfield units, and the voxel values may be a value relative to a value that represents an amount of energy passing through a known volume of water and sensed by an x-ray detector. Items of interest from an explosives-detection (and the detection of other contraband items) perspective tend to have a higher density and a higher atomic number as compared to items not of interest (such as air and clothing that may be included within the containers 104, 106, and 108). For example, the container 106 includes an explosive 152 and, the explosive 152 may be covered with a high-density shielding material (not shown), such as lead, in an attempt to obscure the explosive 152 from being detected. Thus, because items of interest tend to be high-density materials, a range of values known to be associated with high-density materials may be determined. Voxels having values within the range of values, or above a value are voxels that may represent items of interest. In contrast, low-density items, such as a cloth 154 inside of the container 106, may be represented by voxels that have values below the range of values known to be values of voxels that represent high-density materials. Additionally, the values of the voxels of low-density items such as cloth and air tend to be much less than the values of voxels that represent high-density items of interest. Although items of interest may be higher-density items, in some examples the items of interest may have a low-density than background voxels. In these implementations, voxels having a range of values below the range of values are voxels that represent items of interest.

The example system 100 includes a screening apparatus 110 that processes and images the containers 104, 106, and 108 as the containers 104, 106, and 108 move through a tunnel 112. The tunnel 112 passes through the screening apparatus 110, on a conveyor belt 119, and the containers 104, 106, and 108 enter the tunnel at an entrance 115. The tunnel 112 may be considered to be an air-filled region that receives containers for processing and imaging by the screening apparatus 110. The air-filled region also may be referred to as a scan region, and the which is a volumetric region of the screening apparatus 110 that is imaged by, for example, exposing the scan region to x-ray radiation, sensing x-ray radiation that passes through the scan region and any containers present in the scan region, at a sensor, and generating a multi-dimensional image of the scan region based on the sensed radiation. The multi-dimensional image may be, for example, a three-dimensional computed tomography image that is produced from a full volumetric reconstruction of the data collected by the sensor. The screening apparatus generates multi-dimensional images of the entire scan region and multi-dimensional image of entire containers included within the scan region instead of portions of the containers. Generating multi-dimensional images of entire containers may help to improve the throughput of the system 100 by reducing, or perhaps eliminating, the need to pass a particular container through the screening apparatus 110 repeatedly after imaging only a portion of the container and determining that a more complete image should be collected to determine whether the container includes an item of interest.

In the example shown in FIG. 1A, the containers 104, 106, and 108 are imaged by exposing the containers 104, 106, and 108 to radiation, such as x-ray radiation, from a radiation source 120 and sensing the radiation from the radiation source 120 that passes through the containers 104, 106, and 108 at a sensor and processing electronics module 125. A multi-dimensional digital image 130 of the containers 104, 106, and 108 is produced based on the sensed radiation from the radiation source 120 that passes through the containers 104, 106, and 108. As discussed in greater detail with respect to FIGS. 3 and 5, the multi-dimensional digital image 130 is a representation of the inside of the tunnel 112 and items within the tunnel 112, and the multi-dimensional digital image 130 is made up of voxels, which are volumetric elements of data.

The multi-dimensional digital image 130 is compressed into a compressed multi-dimensional digital image 145 such that the digital representation of the image in the compressed multi-dimensional image 145 requires less data that the digital representation of the image in the uncompressed multi-dimensional digital image 130. The compressed multi-dimensional digital image 145 is analyzed to determine the presence of items of interest within or on the containers 104, 106, and 108. In the example shown in FIG. 1A, the container 106 is a suitcase, and the suitcase includes an item of interest, a pipe bomb 152 that includes an explosive material, and an innocuous item, a cloth 154. To analyze the compressed multi-dimensional digital image 145, the image 145 may be transferred over a network to the operator station 140 where a human operator may view a representation of the compressed multi-dimensional digital image 145 on a display 142 to determine whether any of the containers 104, 106, and 108 include items of interest. If the operator determines that an item of interest is present, an alarm 144 may be triggered. In some implementations, the operator station 140 analyzes the multi-dimensional digital images automatically and without human intervention. The compression techniques discussed below may be applied to the multi-dimensional digital image 130 such that the compressed multi-dimensional digital image 145 transferred to an operator station 140 and displayed on the display 142 only includes the explosive 152.

The multi-dimensional digital image 130 includes voxels representing one or more of the containers 104, 106, and 108 as well as voxels representing the inside of the tunnel 112. Because the multi-dimensional digital image 130 is collected over the entire, or almost the entire, length of the tunnel 112, without compression, the multi-dimensional digital image 130 may be large and relatively slow to transfer over the network. For example, in a civilian airport setting, the system 100 may have a requirement of determining whether to flag a container for further processing within thirty seconds after the container enters the screening apparatus 110. However, transferring the uncompressed multi-dimensional digital image 130 over the network to the operator station 140 and displaying the multi-dimensional digital image 130 on the display 142 may consume ten to fifteen of the allotted thirty second period. Thus, only about fifteen to twenty seconds remain for the entire multi-dimensional digital image 130 to be analyzed. However, the compressed multi-dimensional digital image 145 may be transferred over the network to the operator station 140 in a shorter amount of time than the uncompressed multi-dimensional digital image 130, which results in more time for the operator to analyze the image and/or allows the system 100 to process a higher volume of containers. Thus, compressing the multi-dimensional digital image 130 results in a reduction in the latency of the system 100.

Additionally, the multi-dimensional digital image 130 may be compressed without losing the data used to determine whether the multi-dimensional digital image includes a representation of a container that includes an item of interest. The region surrounding the containers 104, 106, and 108 is air, which has material characteristics that are quite different than material characteristics of the items of interest. For example, air has a low density compared to many explosive materials. Thus, air absorbs little to none of the x-ray radiation from the radiation source 120 and thus, although the air is represented by voxels in the multi-dimensional digital image 130, the air is not visible in the displayed images of the containers 104, 106, 108. In contrast, many items of interest, such as explosives, have a higher density and absorb some of the x-ray radiation from the radiation source 120. Thus, the explosives are visible in a displayed representation of the multi-dimensional digital image 130. Even though the portions of the multi-dimensional digital image 130 that represent air are not visible in the multi-dimensional digital image 130, representation of the air in the image 130 results in the image 130 being much larger than an image that only represents the container. However, because the portions of the multi-dimensional digital image 130 that represent air are not used in the analysis of the image 130, these portions may be disregarded with little to no effect on the performance of the system 100. The compression technique used to produce the compressed multi-dimensional digital image 145 may be said to be a lossy data compression technique because the digital data representing air, or other low-density items not of interest, is not represented in the compressed multi-dimensional digital image 145.

Because a large portion of the multi-dimensional digital image 130 may represent air, removal of the portions representing air may significantly reduce the size of the multi-dimensional digital image 130. For example, when the system 100 is used in a civilian airport setting, 75% of the multi-dimensional digital image 130 may be voxels that represent air and may be disregarded. In one example, the containers 104, 106, and 108 may be checked luggage (such as suitcases, sports and musical equipment, and duffle bags). In another example, the containers 104, 106, and 108 may be carry-on luggage (such as hand-transportable items such as purses, briefcases, knapsacks, consumer electronics, and rolling suitcases) or loose items such as shoes. The tunnel 112 is dimensioned to receive the containers 104, 106, and 108. For example, the tunnel 112 may be 1000 millimeters (mm) high and 800 mm wide, and a typical container cross-section may be 700 mm high and 300 mm wide. Thus, the typical container may be about 25% of the cross-sectional area of the tunnel 112, and the multi-dimensional digital image 130 produced by the sensor processing electronics 125 includes the portion of the tunnel 112 that is outside of the container. However, because the portion of the tunnel 112 that is outside of the container generally is not used in determining whether the container includes items of interest, about 75% of the multi-dimensional digital image 130 may be disregarded without effecting the performance of the system 100. Thus, in this example, only about 25% of the multi-dimensional digital image 130 is useful in determining whether the container includes an item of interest. Accordingly, disregarding the portions of the multi-dimensional digital image 130 that represent air outside of the container may result in a reduction in the size of the images analyzed by the screening apparatus 110 and the operator station 140, and a resulting reduction in the latency of the system 100.

In other examples, such as examples in which the system 100 is deployed at a seaport, the tunnel 112 may have a larger dimension to accommodate larger cargo items, such as shipping containers and trucks. However, similar to the civilian airport example, the tunnel 112 is large enough to accommodate the largest expected cargo, and is thus larger than most of the cargo passed through the tunnel 112. As a result, images of the cargo have a large amount of data that may be disregarded for the purposes of analyzing the portion of the image that represents the cargo.

Thus, much of the multi-dimensional digital image 130 includes data that is known to be unnecessary (such as the air surrounding the container) to determining whether a particular container includes items of interest. As discussed in more detail below, disregarding voxels in the multi-dimensional digital image that represent air, that represent materials similar to air, or that have voxel values below a value associated with high-density materials, allows the multi-dimensional digital image 130 to be compressed into a compressed multi-dimensional digital image 145 without losing information that may help determine whether the container includes items of interest. Additionally, the containers themselves may include air or air-like materials not of interest (such as clothing), and the portions of the image representing air or air-like materials inside the containers also may be disregarded or discarded to further compress the image. The compressed images may be transferred to operators and analyzed more quickly than the uncompressed images.

Figure 1B:
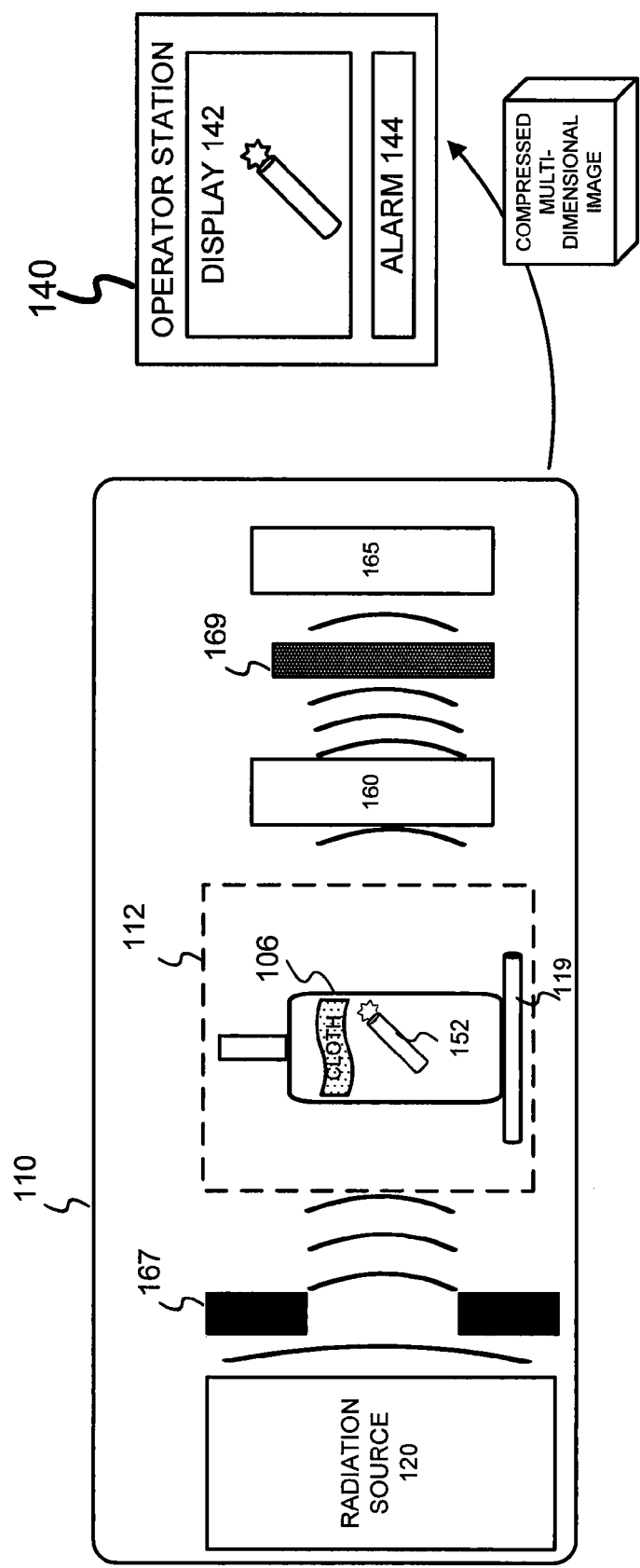
FIG. 1B illustrates a side-view of an example of a materials analysis system.

Referring to FIG. 1B, a side view of the screening apparatus 110 is shown. The screening apparatus 110 includes the radiation source 120, which may be an x-ray source, a first detector 160 and a second detector 165. The screening apparatus 110 also may include a collimator 167 and a filter 169. The radiation source 120, the first detector 160, the second detector 165, the collimator 167, and the filter 169 are outside of the tunnel 112, and the suitcase 106 is within the tunnel 112. As shown in the example of FIG. 1B, the cross-sectional area of the tunnel 112 is larger than the cross-sectional area of the suitcase 106. Thus, much of the image of the inside of the tunnel 112 is a representation of the air within the tunnel 112.

In some implementations, the radiation source 120 exposes an object of interest inside the tunnel 112, such as the suitcase 106, to x-ray radiation of at least two energy levels. The x-rays may be collimated by the collimator 167, which may be made of lead or another material of sufficient thickness to block the x-rays. The collimated x-rays pass through the suitcase 106, are attenuated by the suitcase 106 and the contents of the suitcase 106, and the attenuated x-rays are sensed by the first detector 160. The first detector 160 may be, for example, a scintillator, and the some or all of the attenuated x-rays may pass through the first detector 160. The filter 169 may be placed in front of the second detector 165 such that only x-rays having energies below a cut-off energy of the filter 169 reach the second detector 165. The filter 169 may be made from a metal material such as, for example, copper. The arrangement of the first and second detectors shown in the example of FIG. 1B may be referred to as a front-to-back configuration. In a front-to-back configuration, the detectors 160 and 165 image the same area of the tunnel 112, thus data collected by the detectors 160 and 165 generally is aligned at the time of detection without further correction. In some implementations, the first detector 160 and the second detector 165 may be placed next to each other in a side-by-side configuration. In some implementations, the screening apparatus 110 may include just one detector.

Thus, the first and second detectors 160 and 165 sense attenuated x-rays that pass through the suitcase 106 as the suitcase 106 moves through the air-filled tunnel 112. The sensed x-rays are used to generate the multi-dimensional digital image 130 of the tunnel 112 and the contents of the tunnel 112. As discussed in more detail below with respect to FIGS. 3 and 4, the multi-dimensional digital image 130 is compressed into the compressed multi-dimensional digital image 145 before being analyzed and/or before being transferred over a network to the operator station 140. In some implementations, and as discussed in more detail with respect to FIGS. 5 and 6, the compressed multi-dimensional digital image 145 may be a multi-dimensional digital image having a smaller size than the multi-dimensional digital image 130 that is generated based on a portion of the multi-dimensional digital image 130 selected because voxels within the portion have characteristics of an item of interest. The compressed multi-dimensional image 145 may have a smaller size than the multi-dimensional image 130 because the compressed multi-dimensional image 145 includes less data as compared to the multi-dimensional image 130, has a smaller presentation size than the multi-dimensional image 130, and/or has a smaller memory size than the multi-dimensional image 130. In some implementations, the compressed multi-dimensional image 145 is compressed using a lossy technique that disregards voxels having values between a range of values known to be associated with items that are not items of interest, and the multi-dimensional image 145 is further compressed using a non-lossy image compression technique.

Figure 2:
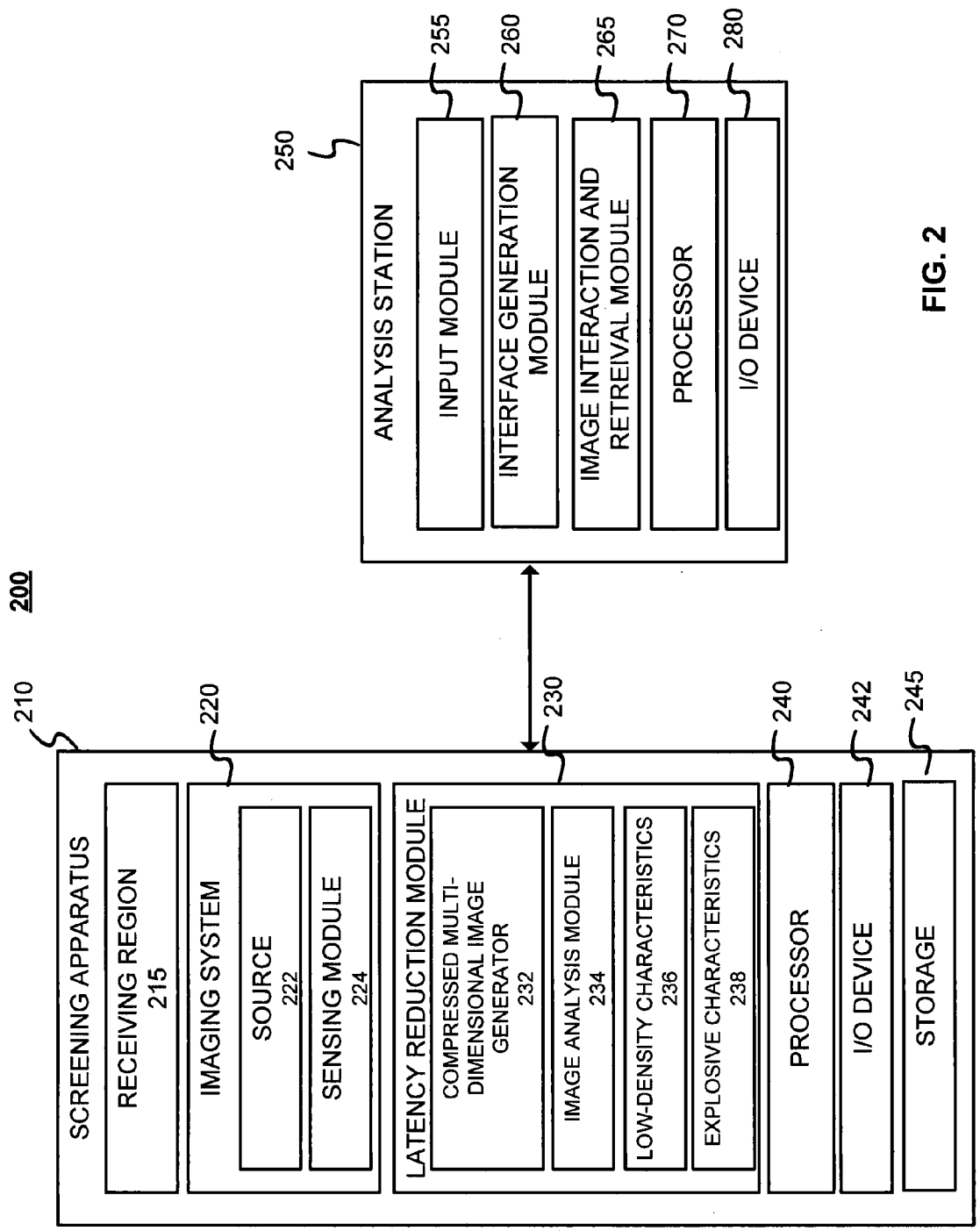
FIG. 2 illustrates a block diagram of a materials analysis system.

Referring to FIG. 2, a block diagram of an example explosives-detection system 200 is shown. The system 200 includes a screening apparatus 210 and an analysis station 250 that receives and displays compressed multi-dimensional digital image data from the screening apparatus 210. The system 200 may be similar to the system 100 discussed with respect to FIGS. 1A and 1B.

The screening apparatus 210 may be used to screen objects to determine whether the object includes items of interest. The screening apparatus 210 includes a receiving region 215 that is configured to receive an object (such as a container) to be screened and move the object through the screening apparatus 210, an imaging system 220, a latency reduction module 230, a processor 240, an input/output device 242, and a storage 245. In particular, the screening apparatus 210 generates a multi-dimensional digital image representing the object and the inside of the receiving region and compresses the multi-dimensional digital image before transferring and analyzing the multi-dimensional digital image. Compressing the multi-dimensional digital image may reduce the latency of the explosives detection system 200.

The receiving region 215 is appropriately sized depending on the types of objects to be screened. For example, the receiving region 215 may be large enough to receive a suitcase or other hand-transportable luggage item. In other examples, the receiving region 215 may accommodate a truck or shipping container. The receiving region may be a tunnel through the screening apparatus similar to the tunnel 112 discussed with respect to FIG. 1A. The screening apparatus 210 also includes the imaging system 220, which includes a source 222 and a sensing module 224. The imaging system 220 images the inside of the receiving region 215 and the objects within the receiving region 215 to produce a multi-dimensional digital image of the receiving region 215 and the objects inside of the receiving region 215. The source 222 may be a source that emits x-rays, and the source 222 may be similar to the radiation source 120 discussed above with respect to FIG. 1B. The sensing module 224 includes detectors that sense radiation produced by the source 222.

The latency reduction module 230 generates a compressed multi-dimensional digital image from the multi-dimensional digital image produced by the imaging system 220. The latency reduction module 230 includes a compressed multi-dimensional digital image generator 232 that generates the compressed multi-dimensional digital image, an image analysis module 234, low-density characteristics 236, and explosives characteristics 238. The image analysis module 234 analyses the multi-dimensional digital image from the imaging system 220 to determine portions of the multi-dimensional digital image that include voxels having characteristics similar to those of explosives or other items of interest. For example, the image analysis module 234 may access the explosive characteristics 238 and compare the voxels in multi-dimensional digital image to those in the explosive characteristics 238 to determine whether the multi-dimensional digital image represents objects that include explosive materials. The image analysis module 234 also analyzes the multi-dimensional digital image to determine portions of the multi-dimensional digital image that are representations of air, or other low-density materials, that may be disregarded by comparing values of voxels in the multi-dimensional digital image to those in the low-density characteristics 236.

The screening apparatus 210 also includes the processor 240, the input/output device 242, and the storage 245. The storage 245 stores instructions that, when executed by the processor 240, cause the latency reduction module 230 to perform operations such as identifying portions of the multi-dimensional digital image from the imaging system 220 that may be disregarded because the portions only include representations of air, materials similar to air, or low-density materials. The storage 245 also may store data sensed by the sensing module 224, instructions for retrieving the data from the sensing module 224, and instructions for generating a multi-dimensional digital image based on the data from the sensing module 224. The storage 245 is an electronic memory module, and the storage 245 may be a non-volatile or persistent memory. The storage 245 may be volatile memory, such as RAM. In some implementations, the storage 245 may include both non-volatile and volatile portions or components.

The processor 240 may be a processor suitable for the execution of a computer program such as a general or special purpose microprocessor, and any one or more processors of any kind of digital computer. Generally, a processor receives instructions and data from a read-only memory or a random access memory or both. The processor 240 receives instruction and data from the components of the screening apparatus 210, such as, for example, the imaging system 220 and/or the latency reduction module 230, to, for example, analyze data from the imaging system 220 to generate a compressed multi-dimensional digital image. In some implementations, the screening apparatus 210 includes more than one processor.

The input/output device 242 may be any device able to transmit data to, and receive data from, the screening apparatus 210. For example, the input/output device 242 may be a mouse, a touch screen, a stylus, a keyboard, or any other device that enables a user to interact with the screening apparatus 210. In some implementations, the input/output device 242 may be configured to receive an input from an automated process or a machine or to provide an output to an automated process or a machine.

The system 200 also includes the analysis station 250. The analysis station 250 includes an input module 255, an interface generation module 260, an image interaction and retrieval module 265, a processor 270, and an input/output device 280. The analysis station 250 may be similar to the operator station 140 discussed above with respect to FIG. 1A. The input module 255 receives one or more compressed multi-dimensional digital images that are transferred over a network from the screening apparatus 210 or the latency reduction module 230. The multi-dimensional digital images may be transferred over a wireless or wired network connection. The interface generation module 260 displays representation of the compressed multi-dimensional digital image on a display such as the display 142 discussed above with respect to FIG. 1A. The analysis station also includes an image interaction and retrieval module 265 that allows interaction with the displayed image. For example, the image interaction and retrieval module 265 may allow an operator to zoom in on an area of interest in the multi-dimensional digital image, request that the screening apparatus 210 transfer additional compressed multi-dimensional digital images, and/or specify that the screening apparatus 210 transfer a particular portion of a multi-dimensional digital image.

The analysis station 250 also includes a processor 270 and an input/output device 280. The processor 270 executes instructions that cause the interface generation module 260 to generate and display the interface and process commands received from the input/output device 280. The input/output device 280 may be any device that allows a user to interact with the analysis station 250. For example, the input/output device 280 may be a mouse, a keyboard, or a touch screen.

In one implementation, the screening apparatus 210 is a continuous image reconstruction system in which the source 222 continuously produces radiation and exposes the receiving region 215 to the radiation, and the sensing module 224 continuously senses radiation from the source 222. The imaging system 220 produces a multi-dimensional image of the receiving region 215 based on the radiation sensed by the sensing module 224. Thus, implementations in which the screening apparatus 210 is a continuous image reconstruction system, the multi-dimensional image of the receiving region 215 is generated regardless of whether the receiving region 215 includes a container.

In a second implementation, the screening apparatus 210 is a non-continuous image reconstruction system. In this implementation, the screening apparatus 210 also includes photocells (not shown) that detect the presence of a container in the receiving region 215, and the presence of a container triggers the source 222 to produce radiation, the sensing module 224 senses radiation passing through the container, and the imaging system 220 generates the multi-dimensional image from the radiation sensed by the sensing module 224. Thus, in implementations in which the screening apparatus 210 is a non-continuous image reconstruction system, the multi-dimensional image is only created when a container is present in the receiving region 215.

Figure 3:
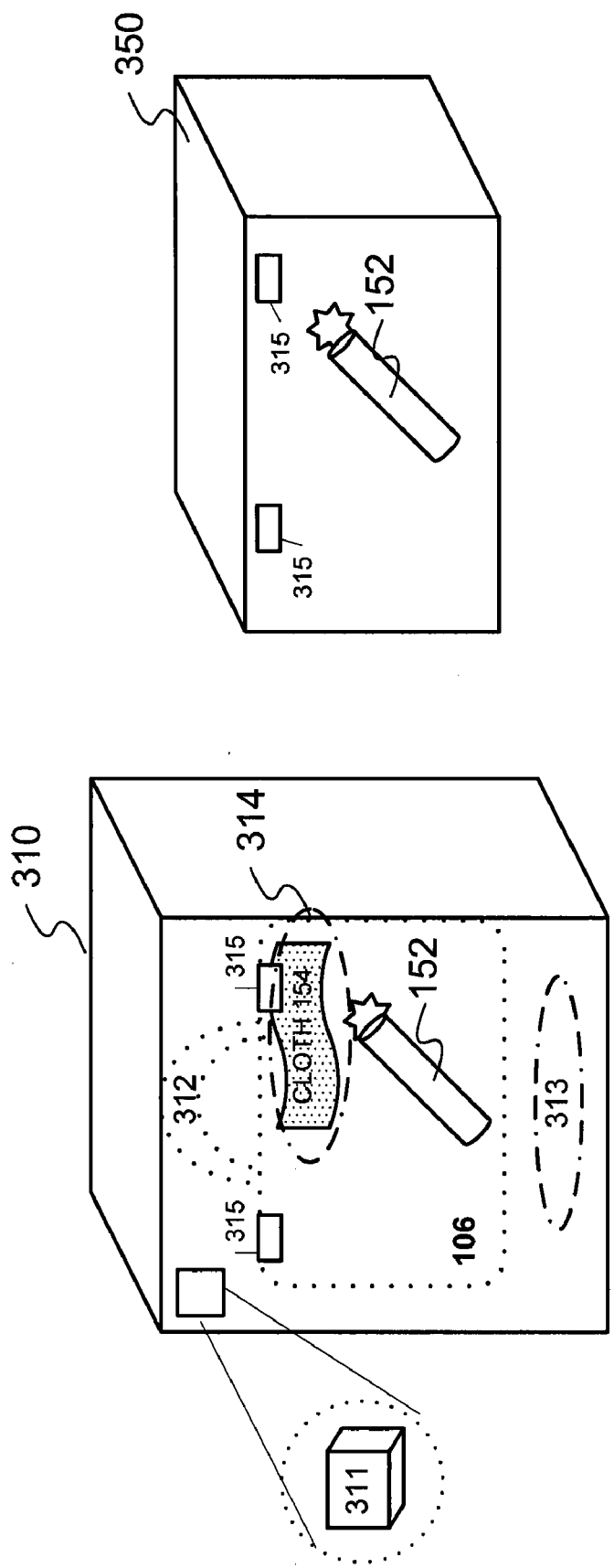
FIGS. 3 and 5 show illustrations of example multi-dimensional digital images and compressed multi-dimensional digital images.

Referring to FIG. 3, an illustration of an example uncompressed multi-dimensional digital image 310 that is compressed into an example compressed multi-dimensional digital image 350 is shown. The uncompressed multi-dimensional digital image 310 may be similar to the multi-dimensional digital image 130 produced by the screening apparatus 110, and the compressed multi-dimensional digital image 350 may be similar to the compressed multi-dimensional digital image 145, both of which are discussed above with respect to FIG. 1A. In the example shown in FIG. 2, the uncompressed multi-dimensional digital image 310 is an image of the container 106, which is a suitcase in the example shown in FIG. 3.

The uncompressed multi-dimensional digital image 310 is a multi-dimensional digital image that represents the inside of the tunnel 112. The multi-dimensional digital image 310 includes voxels, such as the voxel 311, which are volume elements representing a value on a three-dimensional grid. The multi-dimensional digital image 310 includes voxels representing the suitcase 106 and the region of the tunnel 112 that surrounds the suitcase 106. In the example shown in FIG. 3, the image 310 was created by detecting x-ray radiation that passed through the suitcase 106 to a detector. Thus, although the image 120 includes data that represents the entire inside of the tunnel 112, only high-density materials in and around the suitcase 106 are visible in a displayed representation of the multi-dimensional digital image 310. Because the voxels representing the high-density materials are the voxels most useful for determining whether the suitcase 106 includes items of interest, the voxels representing the low-density materials may be disregarded in order to reduce the size of the multi-dimensional digital image 310. As discussed below, the values of voxels representing low-density materials fall within a range of values. Voxels included in the multi-dimensional digital image 310 having values within the range of values may be identified and disregarded to compress the multi-dimensional digital image 310 into the compressed image 350. Disregarding the identified voxels may include removing the identified voxels from the multi-dimensional digital image 310 or replacing the values of the identified voxels with a value, such as zero, that may be stored in fewer bytes than the original value of the voxel.

In the example shown in FIG. 3, materials having a low density, such as air and cloth, would not be visible in a displayed version of the multi-dimensional digital image 310, and these materials are represented with dotted lines in the illustration of the multi-dimensional digital image 310. For example, the suitcase 106 may be a vinyl suitcase with a leather handle 312. Thus, the handle 312 and the surface of the suitcase are transparent, or semi-transparent, to the x-ray radiation and are not visible in a displayed representation of the multi-dimensional digital image 310. As discussed above, the tunnel 112 is filled with air, thus, portions of the multi-dimensional digital image 310, such as portion 313, that represent the inside of the tunnel 112 surrounding the suitcase 106 are representations of air that are not visible, or are barely visible, when the multi-dimensional digital image 310 is displayed. Additionally, the suitcase 106 may include air, or low-density items similar to air, such as the cloth 154. In contrast, higher-density items within and on the suitcase 106, such as suitcase latches 315 and the explosive 152 are visible in a displayed representation of the multi-dimensional digital image 310, and the values of the voxel values representing the latches 315 and the explosive 152 are within a range of values that is distinct from the range of values associated with voxels that represent low-density items.

Figure 4:
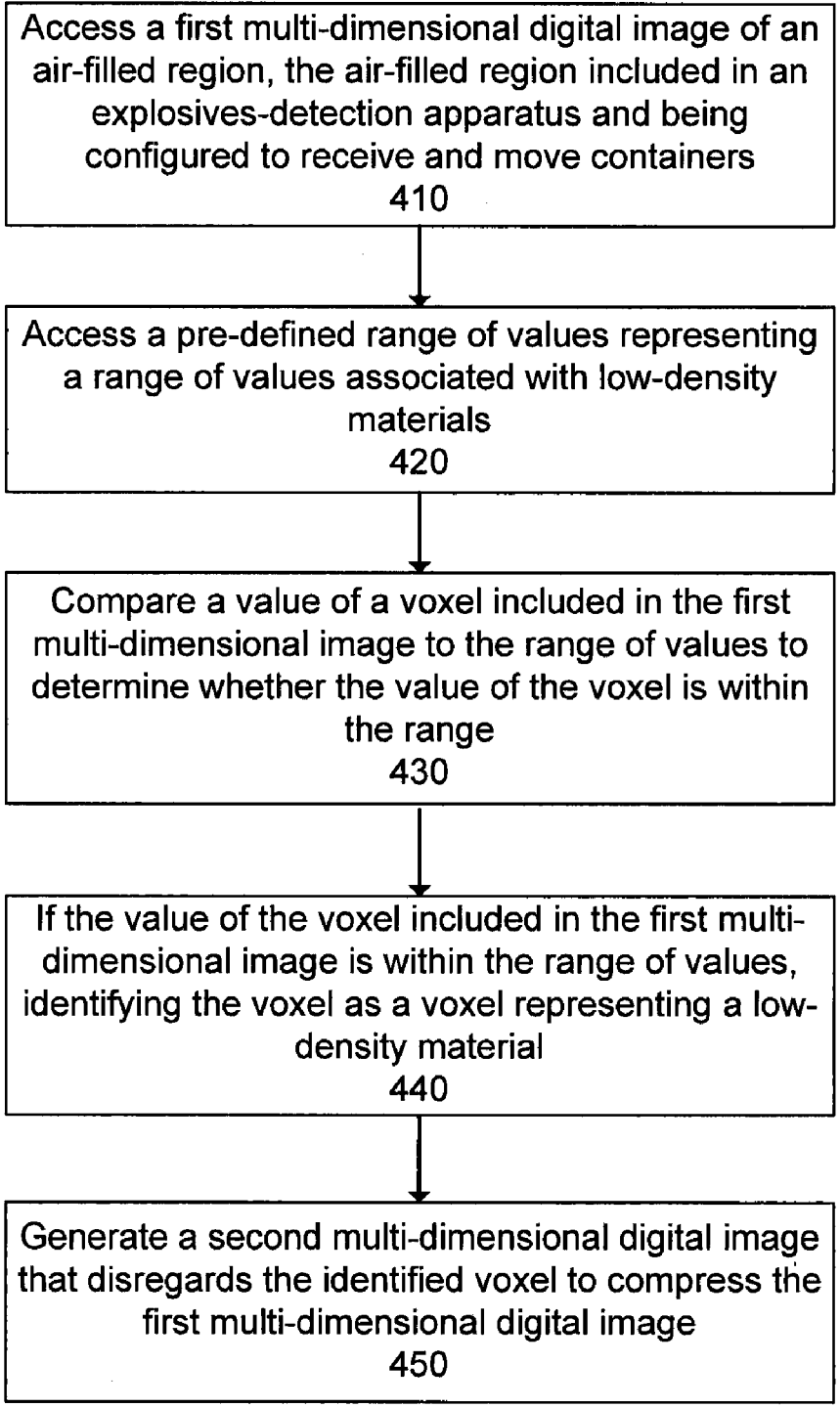
FIGS. 4 and 6 illustrate examples of processes for compressing a multi-dimensional digital image that is analyzed to determine the presence of explosives.

Referring also to FIG. 4, an example process 400 may be used to reduce the size of the multi-dimensional digital image 310 and generate the compressed multi-dimensional digital image 350. In particular, the process 400 identifies voxels in the multi-dimensional digital image 310 that may be disregarded by comparing the voxels in the multi-dimensional digital image 310 to a range of values known to be associated with low-density materials that tend to not be items of interest. The identified voxels are disregarded to reduce the size of the multi-dimensional digital image 130. The process 400 may be performed by one or more processors included in the screening apparatus 110 or the screening apparatus 210.

A first multi-dimensional digital image of an air-filled region is accessed (410). The air-filled region may be, for example the tunnel 112, and the air-filled region may be included in an explosives-detection system such as the screening apparatus 110 discussed above with respect to FIG. 1. The air-filled region may be a region, such as the tunnel 112, that is configured to receive and move containers through the explosives-detection system. The first multi-dimensional digital image may be an image of a container within the air-filled region collected as the container moves through the air-filled region. For example, the first multi-dimensional digital image may be an image such as the multi-dimensional digital image 310 that includes representations of items moving through the air-filled region, such as the suitcase 106 and the contents of the suitcase 106, as well as the air surrounding the suitcase 106 in the tunnel 112. Accessing the first multi-dimensional digital image may include receiving the first multi-dimensional digital image at a processor included in the screening apparatus 110, or accessing the first multi-dimensional digital image may include reading or importing the first multi-dimensional digital image from a memory module.

A pre-defined range of values that represent a range of values associated with low-density materials is accessed (420). The range of values may represent a range of voxel values associated with low-density materials, or other background materials that are not necessarily low-density materials, known to be marginally relevant, or not relevant, to determining whether the first multi-dimensional digital image includes a representation of an item of interest, such as an explosive. For example, the range of values may be a range of values known to be associated with air. As discussed above, a large portion of the first multi-dimensional digital image may represent air because the cross-sectional area of the air-filled region is larger than the cross-sectional area of an average container passing through the air-filled region. Additionally, the container passing through the air-filled region also may include air inside of the container. Because air has properties that are different from those associated with explosives and other items of interest, voxels in the first multi-dimensional digital image that represent air may be disregarded with minimal effect on the portions of the image that represent items of interest. Disregarding the portions of the first multi-dimensional digital image that represent air allows the size of the multi-dimensional digital image to be reduced, thus reducing the latency of the explosives-detection system.

The first multi-dimensional digital image may be a computed tomography image in which low-density materials, such as air, are represented by voxels having values near, but not equal, to zero. Noise in the air causes the value of the voxels representing air to vary by, for example, tens of CT values. Thus, voxels representing air may not be identifiable by simply comparing the voxels to a fixed value. Accordingly, the range of values includes values within the range of variation caused by noise in the air. Additionally, other low-density items that are not of interest for explosive-detection purposes, such as cloth, may be represented by voxels having values similar to air. The range of values may be set to include values of voxels representing these low-density materials as well and/or a separate range of values may be set to include values representing these air-like low-density materials.

The value of a voxel included in the first multi-dimensional digital image is compared to the range of values (430). If the value of the voxel is within the range of values, the voxel is identified as a voxel that represents a low-density material (440). A second multi-dimensional digital image that disregards the identified voxels is generated (450). The second multi-dimensional digital image may be a compressed image that includes voxels representing items other than the low-density items identified by comparing the voxel to the range of values. For example, referring again to FIG. 3, the second multi-dimensional digital image may be an image similar to the compressed multi-dimensional digital image 350. The compressed multi-dimensional digital image 350 consumes less memory than the multi-dimensional digital image 310 because the voxels representing air surrounding the suitcase 106 and other low-density items, such as the suitcase handle 212 and the cloth 154, have been removed from the compressed multi-dimensional digital image 350. Thus, the compressed multi-dimensional digital image 350 includes only the higher-density items, the suitcase latches 315 and the explosive 152. In some implementations, a mapping may be created to represent the original spatial locations of the voxels that have been removed from the image relative to the voxels included in the first multi-dimensional digital image 310.

In the example shown in FIG. 3, the compressed multi-dimensional digital image 350 is smaller (e.g., consumes less memory when stored) than the multi-dimensional digital image 310 because the voxels representing air and other low-density items have been removed. However, in other examples, the size of the multi-dimensional digital image 310 may be reduced by setting the value of the identified pixels to zero, or some other pre-determined value. Once the values of the identified pixels have been set to zero, additional data may be used to represent the first multi-dimensional digital image as the smaller-sized second multi-dimensional digital image. For instance, because the air in the tunnel 112 and inside the container exists in contiguous pockets, many of the identified voxels are in contiguous regions of the first multi-dimensional digital image. Thus, relatively large portions of the first multi-dimensional digital image may be replaced by a single zero value followed by a value "N" that represents the number of contiguous voxels replaced by the single zero value.

For example, the tunnel 112 may be 1000-mm high and 800-mm wide, the suitcase 106 may be 700-mm high and 300-mm wide, and the voxels representing the tunnel 112 and the suitcase 106 may be 1-mm cubic voxels. In this example, the first five hundred lines of data in the first multi-dimensional digital image only represent air. These five hundred lines each include one thousand voxels, and in a typical raster representation, the five hundred line block of air would be stored in memory as five hundred thousand 2-byte, near-zero values that consume one megabyte (MB) of memory. By replacing the values of these voxels to with a single value that is below a threshold of interest, the 500,000 voxels representing the block of air may be represented by a single zero followed by a single 4-byte, value equal to 500,000. Thus, the one megabyte (MB) originally used to represent the 500,000 voxels may be replaced by six bytes. However, despite the reduction in size, the portions of the first multi-dimensional digital image that represent the suitcase 106, which are the portions used to determine whether the suitcase 106 includes items of interest, are retained. Similarly, voxels representing air within the suitcase 106 may be replaced with a single value and an indication of a number of contiguous voxels replaced.

In another example, a pointer referencing a boundary between a region of contiguous voxels representing air, or other low-density materials, may be generated and used to skip over the region of air. In this example, the pointer may be used to retrieve only the portion of the image that includes items other than air, and the second multi-dimensional digital image may be generated from the retrieved portion.

Accordingly, the process 400 may be used to generate a second multi-dimensional digital image that is a compressed image requiring less memory to store than the first multi-dimensional digital image. Because the second multi-dimensional digital image has a smaller size, the second multi-dimensional digital image may be transferred over a communications or data network for analysis and/or viewing more rapidly than the first multi-dimensional digital image. For example, the second multi-dimensional digital image may be transferred to the operator station 140 and displayed on the display 142. The reduced size of the second multi-dimensional digital image as compared to the first multi-dimensional digital image results in faster transfer time, which produces a corresponding reduction in the latency of the explosives-detection system. The second multi-dimensional digital image may be analyzed for the presence of items of interest, such as the explosive 152. Analysis of the second multi-dimensional digital image may be made by, for example, a human operator observing a representation of the second multi-dimensional digital image on the display 142 or by an automated process executing on the screening apparatus 110 or the operator station 140. However, even if the second multi-dimensional digital image is generated and analyzed at the screening apparatus 110 and not transferred over a network, the reduced size of the second multi-dimensional digital image may result reduced analysis time and a corresponding reduction in latency in the explosives-detection system.

Figure 5:
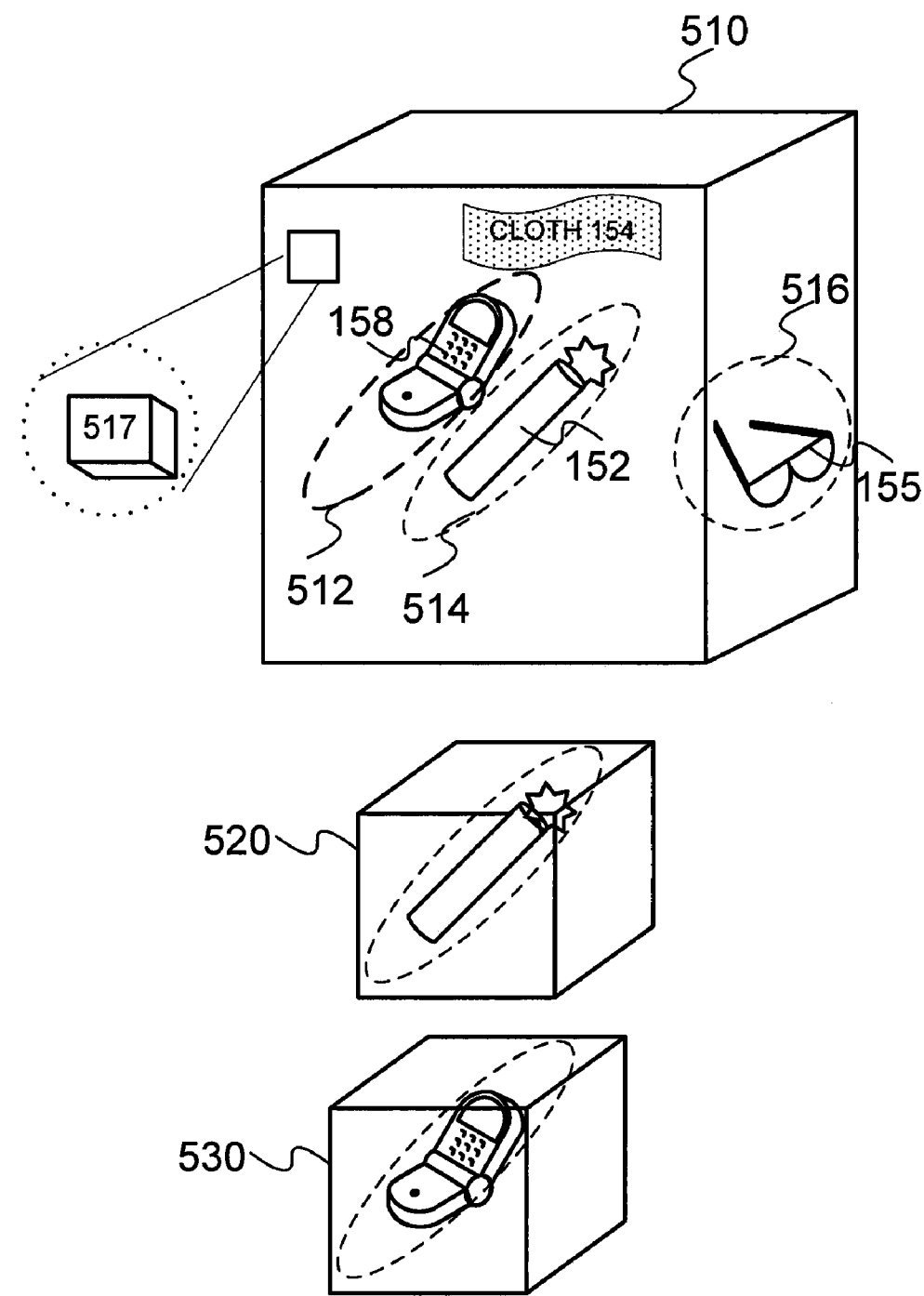

Referring to FIG. 5, an illustration of an example uncompressed multi-dimensional digital image 510 in which portions 512, 514, and 516 have been identified as portions of the multi-dimensional digital image 510 that include voxels having characteristics of items of interest is shown. The identified portions 512, 514, and 516 are transferred over a network for presentation and analysis prior to transferring unselected portions of the multi-dimensional digital image 510. Transferring the portions 512, 514, and 516 before transferring unselected portions of the image 516 may reduce the latency of an explosives-detection system by reducing the amount of data that is transferred over a network from a point in the explosives-detection system that collects data for inclusion in the multi-dimensional digital image 510 (such as the screening apparatus 110) to a point in the explosives-detection system that determines whether an imaged object includes items of interest (such as the operator station 140). Additionally, by transferring portions of the image 510 identified as having characteristics of items of interest, the speed of the analysis of the image object may also be improved as compared to techniques that analyze the entire image 510. Thus, the latency of the explosives-reduction system may be reduced because the operator views the selected portions 512, 514, and 516 as soon as possible without having to wait for the entire multi-dimensional digital image to be transferred over the network to the operator station 140.

The uncompressed multi-dimensional digital image 510 is a multi-dimensional digital image that represents the inside of the tunnel 112. The multi-dimensional digital image 510 includes voxels, such as the voxel 517. The voxels of the multi-dimensional digital image 510 are each associated with a value, and the voxels of the multi-dimensional digital image 510 represent an image of the inside of the tunnel 112 and the items inside of the tunnel 112. In the example shown in FIG. 5, the multi-dimensional digital image 510 includes representations of items that are enclosed within the containers 104, 106, and 108 as well as the air inside of the tunnel 112. In particular, the multi-dimensional digital image 510 includes voxels representing a cellular telephone 158, which is enclosed in the container 104, the explosive 152 and the cloth 154, which are enclosed in the container 106, and sunglasses 516, which are enclosed in the container 108. Additionally, the image 410 includes representations of the containers 104, 106, and 108.

Figure 6:
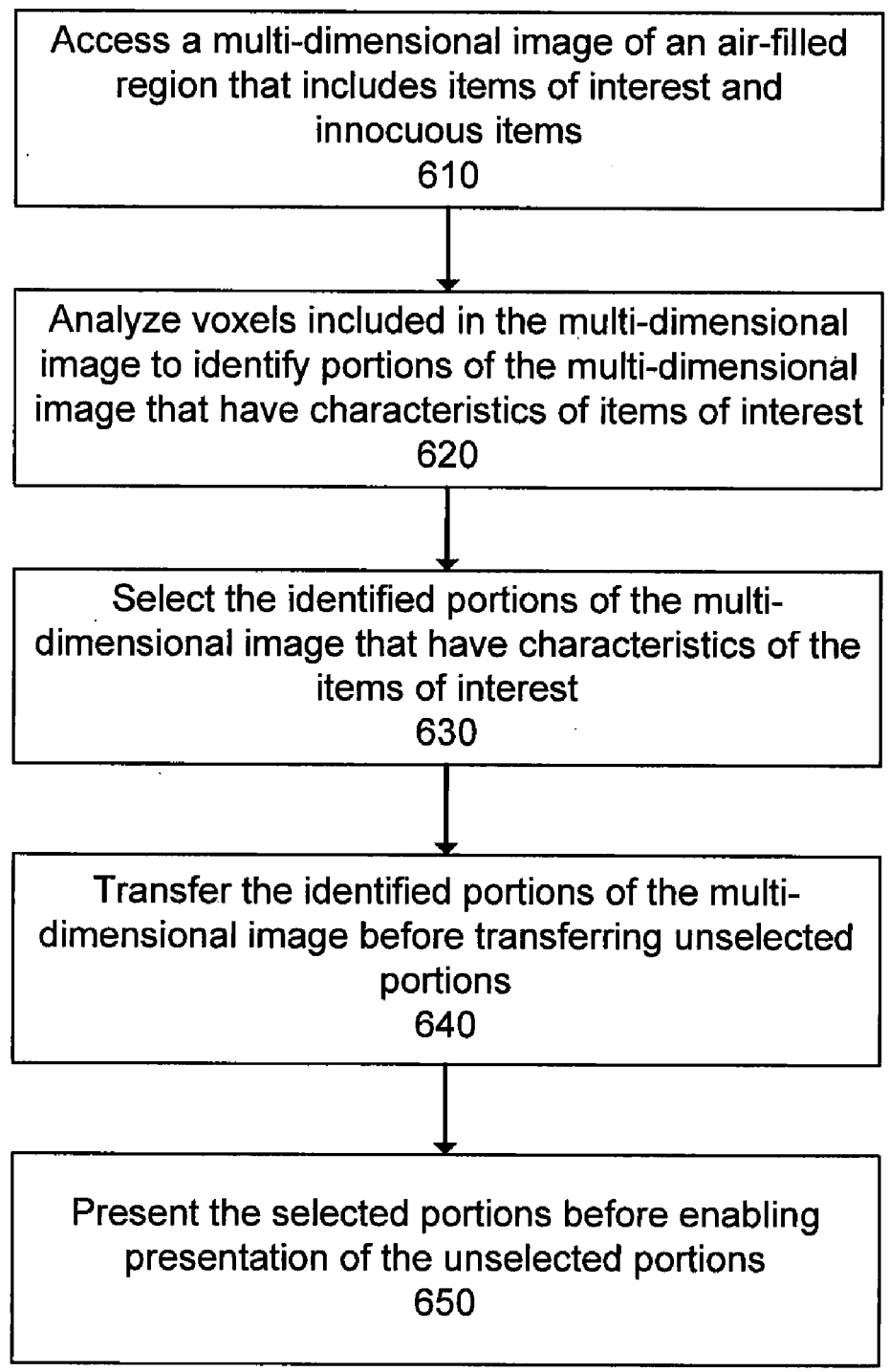

Referring also to FIG. 6, an example process 600 reduces latency in an explosives-detection system by selecting the identified portions 512, 514, and 516 and transferring some or all of the identified portions 512, 514, and 516 over a network before transferring unselected portions. The process 600 may be performed on one or more processors included in the screening apparatus 110 or the screening apparatus 210, and the identified portions 512, 514, and 516 may be transferred to another processor for displaying and/or analysis. For example, the identified portions 512, 514, and 516 may be transferred to the operator station 140 discussed above with respect to FIG. 1A.

A multi-dimensional digital image of an air-filled region that includes items of interest and innocuous items is accessed (610). The air-filled region is a region included in an explosives-detection apparatus, and the air-filled region is configured to receive and move containers through the explosives-detection apparatus. The air-filled region may be the inside of the tunnel 112. The items of interest may be items to be detected by the explosives-detection system and may include explosives and other hazardous materials. The innocuous items may be items that do not pose a threat and are ignored by the explosives-detection system. For example, innocuous items may be items such as clothing packed in the containers, food stuffs, and air within the container and surrounding the container. Innocuous items also may include items that have some characteristics of items of interest but are determined, upon further analysis, to not be items of interest. For example, the explosives-detection system may image containers passing through the explosives-detection system with x-ray radiation, and imaged high-density items that absorb the x-ray radiation may be identified as items of interest. However, some high-density items (such as metal hardware on a suitcase) may turn out to be innocuous items.

The voxels included in the multi-dimensional digital image are analyzed to identify portions of the multi-dimensional digital image that include characteristics of items of interest (620). For example, the voxels may be analyzed to determine the relative density of items represented in the multi-dimensional digital image, and those items having a high density may be flagged as items of interest. Referring again to FIG. 5, the cellular telephone 158, the explosive 152, and the sunglasses 156 have a higher density than the cloth 154, and the cellular telephone 158, the explosive 152, and the sunglasses 156 are flagged as items of interest. In other examples, other characteristics of the items may be taken into account when analyzing the voxels of the multi-dimensional digital image. For example, the shape and size of an representation of an item within the tunnel 112 shown the multi-dimensional digital image may be determined and compared to the shape and size of known items of interest.

Returning to FIG. 6, the identified portions of the multi-dimensional digital image are selected (630), and the identified portions of the multi-dimensional digital image are transferred over a network before transferring unselected portions of the multi-dimensional digital image. Transferring the selected portions before unselected portions may reduce the latency of the explosives-detection system in two ways. First, transferring some or all of the selected portions results in transferring less data over the network, thus the transfer occurs in less time. Second, because the selected portions are selected based on the presence of characteristics of items of interest, the selected portions are likely to be the pertinent portions of the multi-dimensional digital image. By analyzing the pertinent portions of the multi-dimensional digital image before the remainder of the multi-dimensional digital image, the analysis may be completed more quickly.

Returning to FIG. 5, the portions 512, 514, and 516, which include representations of the cellular telephone 158, the explosive 152, and the sunglasses 155, respectively, are selected. The portions 512 and 514 are extracted as smaller multi-dimensional digital images 520 and 530, respectively, and transferred over the network for further processing and analysis. Along with the representation of the cellular telephone 158 and the explosive 152, surrounding voxels are also included in the smaller multi-dimensional digital images 520 and 530. In some implementations, the selected portions may be prioritized based on a measure of confidence that a particular portion includes an item of interest. The measure of confidence may be based on characteristics of the voxels included in the portion such as, for example, the size, shape and density of the object represented by the voxels included in the portion. For example, in the example shown in FIG. 5, the shape of the explosive 152 may result in the portion 514 and the corresponding multi-dimensional digital image 520 having a relatively high confidence of the presence of an item of interest as compared to the portion 514, which includes the representation of the sunglasses 155, and the portion 512, which includes the representation of the cellular telephone 158. Thus, the multi-dimensional digital image 520 may be transferred over the network before the other selected portions and before the unselected portions. The multi-dimensional digital image 520 may be transferred over the network as soon as the measure of confidence is determined and before a measure of confidence is determined for the selected portions 512 and 516. For example, if the measure of confidence exceeds a threshold measure of confidence, the probability of the portion including an item of interest is high and the portion may transferred as soon as the confidence is determined to further improve the speed of analysis and reduce latency in the explosives-detection system.

Returning to FIG. 6, the selected portions are presented before enabling presentation of the unselected portions (650). The selected portions, such as the portions 512, 514, and 516 shown in FIG. 5 are presented to an operator of the explosives-detection system or to an automated process before the unselected portions are enabled or available for presentation. For example, the portions 512, 514, and 516 may be displayed to a human operator on the display 142 before the unselected portions of the multi-dimensional digital image are available for presentation on the display 142. This may ensure that the operator views the selected portions 512, 514, and 516 as soon as possible and without having to wait for the entire multi-dimensional digital image to be transferred over the network to the operator station 140.

A number of implementations have been described. Nevertheless, it will be understood that various modifications may be made without departing from the scope of the disclosure. Accordingly, other implementations are within the scope of the following claims.

What is claimed is:

1. A computer-implemented method of compressing data in a materials-detection system, the method comprising:
    generating a first multi-dimensional digital image of a scan region, the scan region being included in a materials-detection system and being configured to receive a container, wherein the first multi-dimensional digital image comprises at least one voxel that represents a space that is at least partially inside of the container;
    accessing a pre-defined background range of values, the background range of values representing a range of values associated with non-target materials and the background range of values being distinct from values associated with target materials;
    comparing a value of the at least one voxel that represents a space that is at least partially inside the container to the background range of values to determine whether the value of the at least one voxel is within the background range of values;
    if the value of the at least one voxel is within the background range of values, identifying the at least one voxel as an identified voxel that represents a non-target material; and
    generating a second multi-dimensional digital image that disregards the identified voxel to compress the first multi-dimensional digital image.

2. The method of claim 1, wherein generating a second multi-dimensional digital image comprises generating a second multi-dimensional digital image that excludes the identified voxel.

3. The method of claim 2 further comprising generating a mapping that represents the location of the identified voxel relative to other voxels included in the first multi-dimensional digital image.

4. The method of claim 1, wherein generating a second multi-dimensional digital image comprises generating a second multi-dimensional digital image that replaces the value of the identified voxel with a pre-defined value.

5. The method of claim 1 further comprising analyzing the second multi-dimensional digital image for target materials without analyzing the disregarded voxel.

6. The method of claim 1, wherein the background range comprises a subset of the ranges for non-target materials.

7. The method of claim 1, wherein the non-target material comprises air and air-like materials.

8. The method of claim 1, wherein:
    the scan region includes a container that includes non-target materials and target materials, and
    the image of the scan region includes voxels representing the entire container, voxels representing the non-target items, and voxels representing the target materials.

9. The method of claim 1, wherein the target materials comprise one or more of explosives and controlled substances.

10. The method of claim 1 further comprising:
    transferring the second multi-dimensional digital image across a network to a processor remote from the materials-detection system; and
    analyzing the second multi-dimensional digital image for the presence of target materials.

11. The method of claim 10, wherein analyzing the second multi-dimensional digital image for the presence of target materials comprises analyzing a visual presentation of the second multi-dimensional digital image for the presence of target materials.

12. The method of claim 1, wherein the first multi-dimensional digital image includes a representation of a container and further comprising:
    identifying a contiguous segment in the first multi-dimensional digital image as a segment that includes voxels representing a non-target material outside of the container, the segment being bound by a boundary representing an interface between the non-target material outside of the container and an edge of the container;
    generating a pointer in the first multi-dimensional digital image, the pointer referring to the boundary;
    transferring the pointer over a network to a processor remote from the materials-detection system;
    receiving a request from the remote processor for a portion of the first multi-dimensional digital image referred to by the pointer, the portion including the representation of the container; and
    transferring the portion of the first multi-dimensional digital image over the network to the remote processor.

13. The method of claim 1, wherein the scan region comprises a tunnel sized to accommodate luggage and hand-carried packages.

14. The method of claim 1, wherein the scan region comprises a region configured to receive cargo.

15. The method of claim 1, further comprising:
compressing the second multi-dimensional image with a non-lossy compression technique; and
generating a third multi-dimensional image from the compressed second multi-dimensional image.

16. The method of claim 1, wherein the scan region includes a container and air surrounding the container.

17. The method of claim 1 further comprising determining whether the scan region includes a container before generating the first multi-dimensional image.

18. A materials-detection system having a reduced latency, the system comprising:
a screening apparatus comprising:
  a scan region configured to receive a container,
  an imaging system configured to produce a first multi-dimensional digital image of the scan region, the first multi-dimensional digital image including voxels, at least one voxel being a voxel that represents a space that is at least partially inside of the container,
  a latency reduction module configured to compress the first multi-dimensional digital image of the receiving region, the latency reduction module being configured to:
    receive the first multi-dimensional digital image of an air-filled region,
    access a pre-defined background range of values, the background range of values representing a range of values associated with non-target materials and the background range of values being distinct from values associated with target materials,
    compare a value of the at least one voxel that represents a space that is at least partially inside the container to the background range of values to determine whether the value of the at least one voxel is within the background range of values,
    if the value of the at least one voxel is within the background range of values, identify the at least one voxel as an identified voxel that represents a non-target material, and
    generate a second multi-dimensional digital image that disregards the identified voxel to compress the first multi-dimensional digital image; and
  an analysis station configured to:
    receive the second multi-dimensional digital image, and
    present the second multi-dimensional digital image.

19. The method of claim 1, wherein the first multi-dimensional image further comprises at least one voxel that represents a space that is outside of the container.

20. The method of claim 1, wherein the first multi-dimensional image further comprises at least one voxel that represents a space that is outside of the container, and further comprising:
comparing the at least one voxel that represents the space that is outside of the container to the background range of values; and
if the value of the at least one voxel that represents the space that is outside of the container is within the background range of values, identifying the at least one voxel as a voxel that represents a non-target material.

21. The method of claim 1, wherein the non-target material comprises a low-density material.

22. The method of claim 1, further comprising comparing each voxel in the first multi-dimensional image to the background range of values.

23. The system of claim 18, wherein the scan region is further configured to move containers through the screening apparatus.

* * * * *